United States Patent [19]

Rasche

[11] Patent Number: 5,122,275
[45] Date of Patent: Jun. 16, 1992

[54] SIMULATED MOVING BED CHROMATOGRAPHIC SEPARATION

[75] Inventor: John F. Rasche, Decatur, Ill.

[73] Assignee: A. E. Staley Manufacturing Company, Decatur, Ill.

[21] Appl. No.: 403,011

[22] Filed: Sep. 5, 1989

Related U.S. Application Data

[63] Continuation of Ser. No. 188,635, May 2, 1988, abandoned, which is a continuation of Ser. No. 861,026, May 8, 1986, abandoned.

[51] Int. Cl.⁵ .............................. B01D 15/08
[52] U.S. Cl. ........................ 210/659; 210/198.2; 127/46.1; 127/46.2
[58] Field of Search .......... 127/30, 46.1, 46.2, 127/46.3, 55; 210/635, 656, 659, 198.2

[56] References Cited

U.S. PATENT DOCUMENTS

| | | | |
|---|---|---|---|
| 2,985,589 | 5/1961 | Broughton et al. | 210/34 |
| 3,291,726 | 12/1966 | Broughton | 208/310 |
| 3,373,872 | 3/1968 | Hrdina | 210/659 |
| 3,847,550 | 11/1974 | Scott | 210/659 |
| 4,157,267 | 6/1979 | Odawara et al. | 127/46 A |
| 4,182,633 | 1/1980 | Ishikawa et al. | 127/46 A |
| 4,293,346 | 10/1981 | Landis et al. | 127/46 A |
| 4,319,929 | 3/1982 | Fickel | 127/46.2 |
| 4,332,623 | 6/1982 | Ando | 127/46.2 |
| 4,366,060 | 12/1982 | Leiser | 127/46.2 |
| 4,379,751 | 4/1983 | Yoritomi | 210/659 |
| 4,402,832 | 9/1983 | Gerhold | 127/46.2 |
| 4,409,033 | 10/1983 | LeRoy | 127/46.2 |
| 4,412,866 | 11/1983 | Schoenrock | 127/46.2 |
| 4,422,881 | 12/1983 | Devos | 127/46.2 |
| 4,478,721 | 10/1984 | Gerhold | 210/659 |
| 4,498,991 | 2/1985 | Oroskar | 210/659 |
| 4,521,252 | 6/1985 | Miyake et al. | 127/46.3 |
| 4,529,828 | 7/1985 | Antos et al. | 585/828 |
| 5,064,539 | 11/1991 | Tanimura | 210/198.2 |

Primary Examiner—Ernest G. Therkorn
Attorney, Agent, or Firm—Michael F. Campbell; J. Daniel Wood

[57] ABSTRACT

A method and apparatus for separation of an extract component from a raffinate component in a simulated moving bed chromatographic separation train system. The system includes a plurality of beds, packed with a sorbent material, connected to form a closed recycle loop. Inlets to the train are provided for a feed stream and a desorbent stream along with outlets for removal of a raffinate stream and an extract stream. Increased product throughput and yield are obtained by intermittantly introducing and withdrawing the various streams to the train while continuously recycling a portion of the fluid in the system.

8 Claims, 2 Drawing Sheets

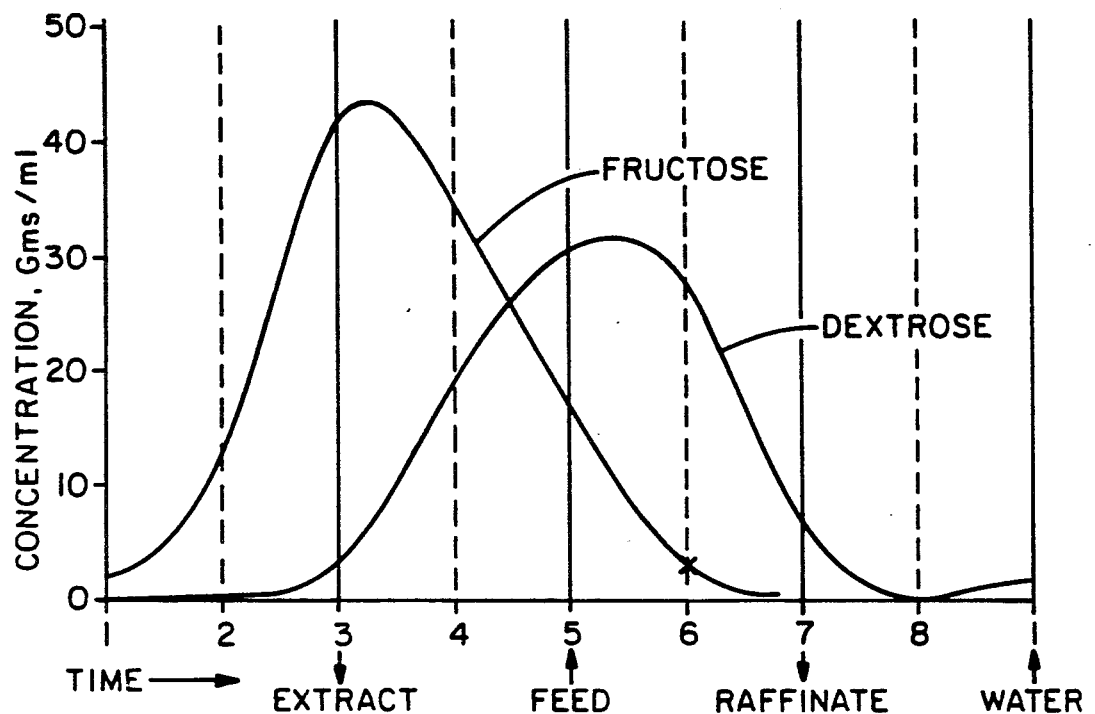
FIG. 1 EIGHT BED TRAIN CONTINUOUS FEED SACCHARIDE DISTRIBUTION
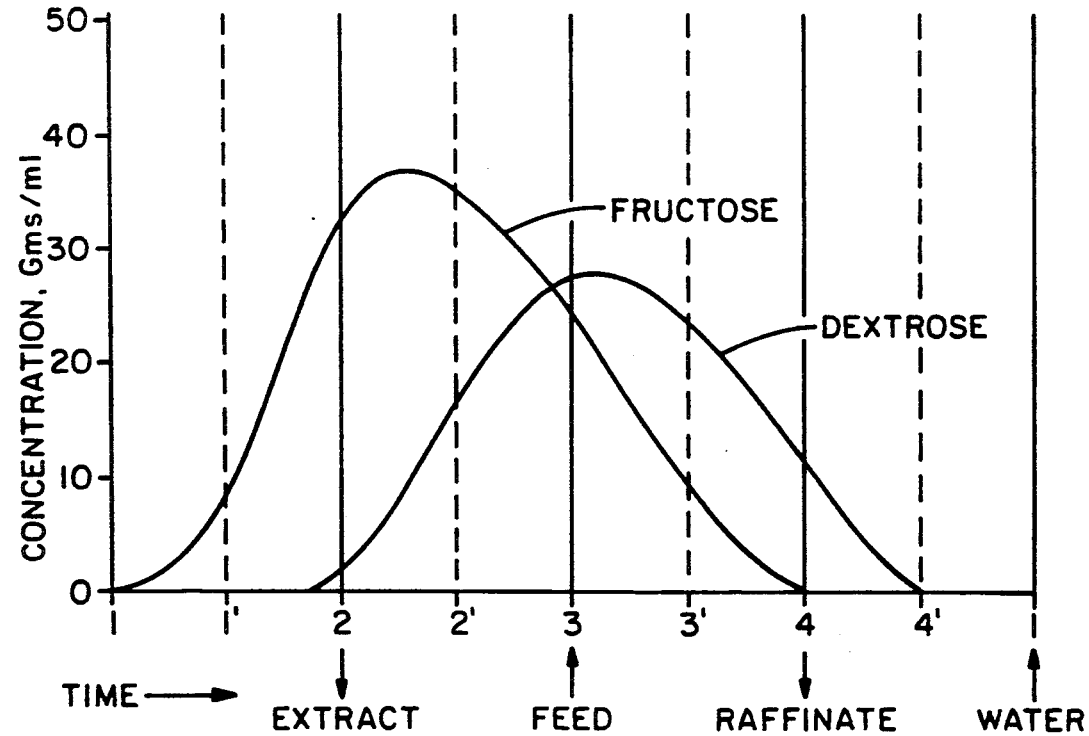
FIG. 2 FOUR BED TRAIN INTERMITTENT FEED SACCHARIDE DISTRIBUTION

SIMULATED MOVING BED CHROMATOGRAPHIC SEPARATION

This application is a continuation of application Ser. No. 188,635 filed May 2, 1988 which is a continuation of application Ser. No. 861,126 filed May 8, 1986, both now abandoned.

This invention relates generally to fluid separation apparatus and more particularly to a simulated moving bed chromatographic fluid separation apparatus and method of operating such apparatus which provides increased throughput and yield.

The use and operation of simulated moving bed chromatographic adsorption separation apparatus is well-known and widely used in the chemical and petrochemical industries. Simulated moving bed apparatus are described in U.S. Pat. Nos. 2,985,589; 3,291,726; and 4,182,633, the disclosures of which are incorporated by reference. Simulated moving bed apparatus have particular usefulness in the separation of fructose from a fluid mixture of dextrose and fructose and the present invention is described in connection with this utility. However, it is to be understood that the invention has wide application in the field of simulated moving bed separation processes and apparatus and is useful in the separation of a wide variety of fluids, some of which are disclosed in the above-identified patents.

Generally, one of the limiting factors in the commercial manufacture of fructose is the step of separating fructose from an aqueous saccharide solution of dextrose and fructose that is obtained from the enzymatic hydrolysis of starch. Separation of fructose and dextrose is conventionally carried out in a simulated moving bed chromatographic separation unit utilizing an ion exchange resin or a zeolite as the sorbent. Suitable resins include the alkali and alkaline earth metal salts of nuclearly sulfonated styrene cation exchange resins cross-linked with divinyl benzene. The particle size of the resin is preferably between about 200 and about 400 microns. The sorbent is arranged in a number of zones or beds in a vertical column or in a number of discrete vessels which for the purpose of this description is referred to as a "train". The mixed saccharide feed stream and desorbent fluid, water in the instance of separating fructose from dextrose, are fed to the train at spaced intervals and a fructose rich extract stream and a dextrose rich raffinate stream are withdrawn at spaced intervals. The upstream and downstream beds of the train are connected by a fluid conduit to provide a closed recycle loop and in order to simulate a moving bed the various points of introduction and withdrawal of fluids to the unit are intermittently advanced downstream in a timed sequence based upon the concentration profile of the system.

The throughput and thus the yield of a simulated moving bed train for separating fructose and dextrose is, in large measure, directly related to the pressure drop across the bed. It is understood that the pressure drop across the various beds in a train varies depending upon the flow rate through a particular bed and the saccharide concentration. A typical chromatographic separation train will have a maximum pressure drop across a bed (column) of between about 60 and about 100 psi. It would be desirable to increase the feed rate to take advantage of the increased separation capacity of currently available resins. However, increasing the flow rate by twenty percent causes the sorbent bed to compact causing the pressure drop to increase as much as double, which is unacceptable. Further, bed compaction results in increased head space in the bed, which is undesirable.

It is known to reduce the pressure drop by reducing the sorbent bed height, by increasing the resin bead size and by reducing the viscosity of the fluid flowing through the train, i.e., by decreasing the saccharide concentration of the feed stream. However, each of these solutions results in a reduction of the overall yield of the train which is generally undesirable.

It is an object of the present invention to provide a simulated moving bed chromatographic separation apparatus and method which permits increased throughput and yield of the desired component of components from a fluid mixture. Another object is to provide a simulated moving bed separation apparatus and method which results in a reduced pressure drop as compared to conventional apparatus, but provides an equivalent or greater yield of product. An additional object is to provide a simulated moving bed separation apparatus and method which provides for intermittent introduction of feedstock and intermittent withdrawal of product while maintaining a continuous recycle of a portion of the fluid within the system.

These and other objects of the invention are set forth in the following detailed description and in the accompanying drawings of which:

FIG. 1 is the saccharide profile across a conventional eight bed train for the separation of fructose and dextrose.

FIG. 2 is the saccharide profile across a four bed train in accordance with the present invention.

Figure 3:
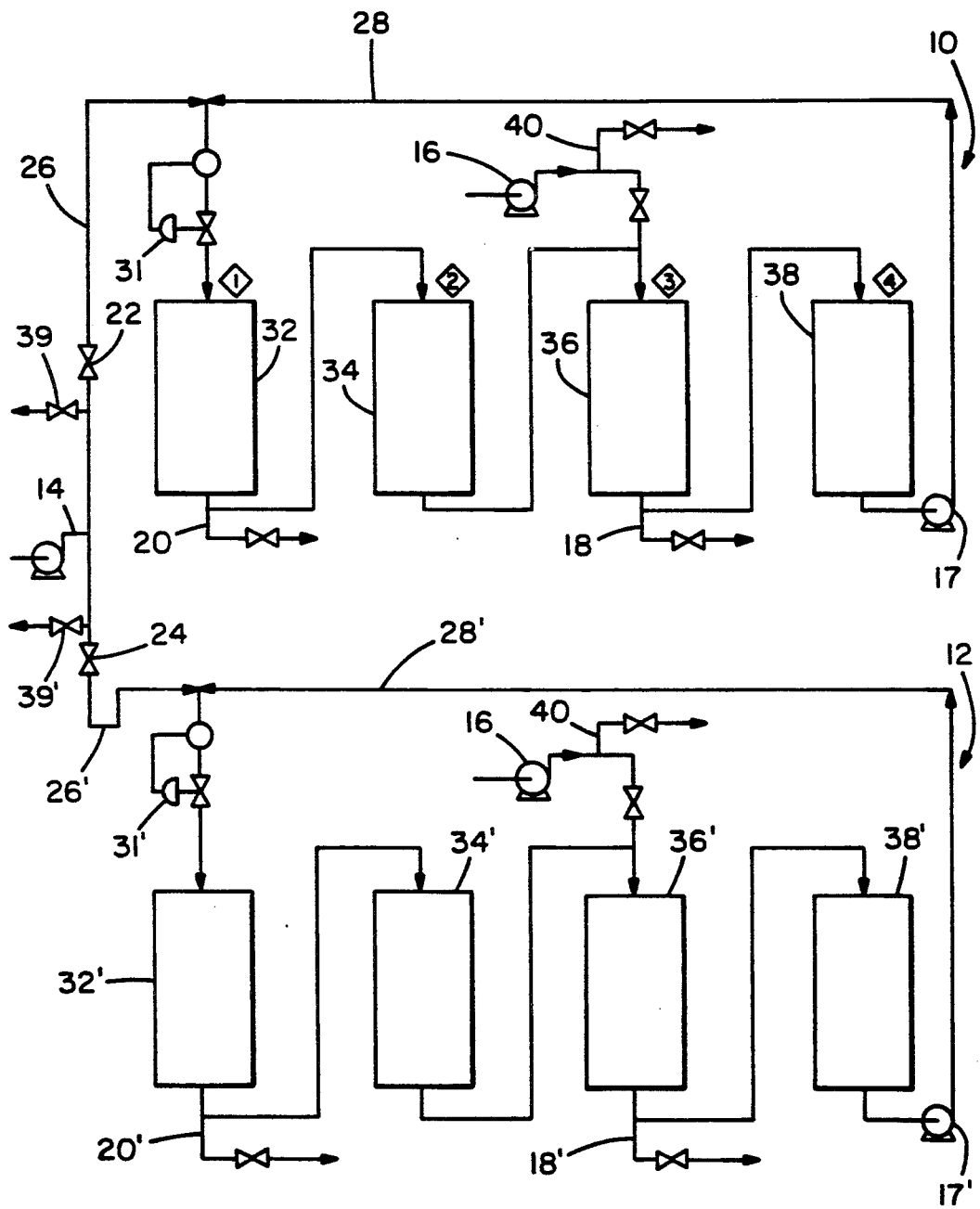
FIG. 3 is a schematic diagram of a preferred embodiment of the present invention.

Very generally, the present invention is directed to a method and apparatus for simulating a moving bed chromatographic fluid separation system which includes a plurality of beds packed with a sorbent material and having fluid conduit means between the beds and between the upstream and downstream ends of the beds to form a closed recycle loop. Spaced apart means are provided for introducing a feed stream and a desorbent stream into the beds and spaced apart means are provided for withdrawing a raffinate stream and an extract stream from the beds. In accordance with the invention, means are provided for intermittently introducing and withdrawing the fluid streams while continuously recycling a portion of the fluid through the recycle loop.

The invention is further directed to a method for the separation of an extract rich stream and a raffinate rich stream from a fluid feed stream containing a mixture of extract and raffinate components comprising intermittently introducing and withdrawing the various streams at spaced locations along the train. In accordance with conventional practices for producing a high fructose product using calcium form ion exchange resin, the feed stream is introduced into one of a plurality of separation beds of packed absorbent material at a first point. A dextrose rich raffinate stream is withdrawn from another of the beds at a second point downstream from the first point. A desorbent stream is introduced into another of the beds at a third point downstream from the second point and a fructose rich extract stream is withdrawn from the train at a fourth point downstream of the third point. A portion of the fluid within the train is continuously recycled from the downstream end to the upstream end of the train. Generally, and particularly in the separation of fructose and dextrose, the volume of fluid recycled is substantially larger than the volume of the fluids introduced and withdrawn. The points of introduction and withdrawal are advanced downstream of the train in a timed sequence such that a constant saccharide profile is established which moves uniformly downstream of the train.

When separating other chemicals, the points of introduction and withdrawal may be different, depending upon the adsorbent and desorbent used and the concentration curves that are established. Generally, the feed stream is introduced at the point of maximum concentration of the dissolved components, i.e., at the point where the composition of the fluid in the system is approximately the same as the composition of the feed stream. The desorbent stream is introduced at the point of minimum concentration of dissolved components, i.e., at the point of maximum desorbent concentration. The extract and raffinate streams are withdrawn at points which give desired products.

There is illustrated in FIG. 1 the saccharide profile for a conventional eight bed continuous feed train with concentration as the abscissa and time as the ordinate.

FIG. 2 is an illustration of the saccharide profile of a four bed intermittent feed train in accordance with the present invention. The slight differences in the shape of the saccharide profiles of FIGS. 1 and 2 is the result of different feed rates and different desorbent to feed ratios. The time required for the saccharide profile to move from a starting point along the entire train and back to the starting point, termed a cycle, is divided by the number of beds, in this instance 8, termed steps, as indicated in FIG. 1. With the profile in the location relative to the eight beds illustrated in FIG. 1, the feed stream would be introduced between beds 4 and 5, raffinate withdrawn between beds 6 and 7, desorbent introduced between beds 8 and 1 and extract withdrawn between beds 2 and 3. After one-eighth of the time cycle, i.e., one step, the points of introduction and withdrawal are advanced one bed downstream, the feed stream being introduced between beds 5 and 6, and so forth.

In accordance with conventional technology, if the number of beds in a simulated moving bed separation apparatus is reduced, for example from eight to four, the feed rates, withdrawal rates and recycle rate are also proportionately reduced. Reducing the recycle rate significantly reduces the pressure drop across the beds. However, when there are fewer beds in the train, the duration of each step increases. For Example, in a four bed train each step becomes one-fourth of the cycle. As can be seen from FIG. 1, the fructose concentration that may be obtained in an extract stream over any one-fourth of the cycle is generally so dilute and/or contaminated with dextrose that it is unacceptable for commercial production. Accordingly, although the advantage of lesser pressure drop in fewer bed trains has been known, the nature of the saccharide profile is such that it has been necessary to use a large number of beds, e.g., 8 to 20, in order to obtain a sufficiently concentrated, high purity fructose containing extract stream.

In accordance with the present invention, increased throughput and yield are obtained by intermittently introducing and withdrawing the various streams to the train while continuously recycling a portion of the fluid in the system. It has been found that by dividing each step into an active period of fluid introduction and withdrawal followed by a passive period of no fluid introduction and withdrawal, referred to as a rest period, a four bed train may be operated at higher production rates per unit of resin volume than an eight bed train. However, since the recycle rate is less than that of an eight bed train, the pressure drop across each bed is substantially reduced.

In a preferred embodiment of the invention illustrated in FIG. 3, two trains having four beds each are paired with appropriate piping so that fluid introduction and withdrawal alternates between the two trains. In this manner, there is constant feed and withdrawal from the overall system which minimizes pressure surges and the like.

The two trains 10 and 12 are identically configured and for purposes of explanation the parts of train 12 corresponding to train 10 are given a corresponding number followed by a prime. The trains 10 and 12 are fed alternately from a raw material source, not shown, via feed conduit 14. Similarly, desorbent fluid is supplied to desorbent pump 16 and extract and raffinate are withdrawn via conduits 18 and 20.

Suitable control valves 22 and 24 actuated by a timing circuit, not shown, control the introduction of the feed stream into either train 10 or 12. These valves allow feed to enter between beds 38 and 32 or 38' and 32'. Each train has three other valves (not shown) in parallel with valve 22 and valve 24 to allow feed to enter between all other pairs of beds. Similar control valves, also controlled by the timing circuit, are provided for the desorbent, extract and raffinate streams.

The feed stream flows through conduit 26 and is mixed with the recycle stream from conduit 28. Pump 17 following bed 38 is used to recycle fluid around all four beds. Other recycle pumps are not shown; however, booster pumps can be installed as needed between other bed pairs. The mixture flows through a flow control valve 31 into sorbent bed 32. The flow control valves 31 and 31' are independently operable to control the recycle ratio in each of trains 10 and 12. This is generally necessary in order to independently establish the proper saccharide profile in each train. A portion of the fluid exiting sorbent bed 32 is withdrawn as a raffinate stream through conduit 20 and the remainder flows into sorbent bed 34. The fluid exiting sorbent bed 34 and a fresh desorbent stream are introduced into sorbent bed 36. A portion of the fluid exiting sorbent bed 36 is withdrawn as an extract stream via conduit 18 and the remainder of the fluid is passed through sorbent bed 38 and recycled via conduit 28 back to sorbent bed 32 where it is mixed with fresh feed stock from conduit 26.

The length of time of a cycle, i.e., the time it takes for the saccharide profile to pass a fixed point in the train may vary widely depending upon the recycle rate. In the system illustrated in FIG. 3, the length of the cycle is about two hours. Accordingly, each step is 30 minutes and during each step the respective trains have fluid introduction and withdrawal for 15 minutes followed by a rest period of 15 minutes.

As further seen in FIG. 3, bypass conduits 39 and 40 are provided which permits each of the trains to be isolated for repair etc. while the other train continues in operation.

The throughput per unit of resin volume may typically be increased by as much as 50 percent. This permits the yield to be increased by 40 to 50 percent. The use of a smaller volume of fluid being recycled permits the use of smaller pumps which results in cost savings.

It is to be understood that the reduction in the number of steps and the length of the active and passive periods within each step may be varied in order to achieve the desired throughput and purity. For example, the steps may be reduced from eight to six or five instead of four as illustrated. Further, the active and passive periods within the steps may vary from the fifty-fifty ratio illustrated in FIG. 3, particularly in a system that has but a single train as compared to the two train system illustrated in FIG. 3.

It is also contemplated that the recycle rate can be varied during processing. For example, it may be desirable to slow down the recycle rate during the active portion of each step. This results in a slowing down of the movement of the concentration profile along the train. Assuming a proper concentration curve, this might result in a purer or more concentrated extract or raffinate stream. During the passive portion of the step the recycle rate could be increased so that the concentration curve catches up and is in the proper position when the next step is commenced. Other variations, including interrupting the recycle flow, are contemplated.

In the embodiment illustrated in FIG. 3, each of the four bed trains is operated on a four step cycle with each step being divided into an active period and a passive period of equal duration. Fluids are introduced and withdrawn during the active first half of each step. During the second passive half of each step no fluids are introduced or withdrawn and all of the fluid in the train is recycled. At the conclusion of the step the points of fluid introduction and withdrawal are shifted downstream one bed and fluid introduction and withdrawal is reinstituted for the active one half step followed by a passive one half step of no fluid introduction or withdrawal. The purpose of resting for one half of each step is to permit the appropriate point on the saccharide profile, which is moving along the train, to reach the next bed in the train.

Referring to FIG. 2, fluids are introduced and withdrawn from the indicated points during the active period of the step, i.e., the time required for the saccharide profile to advance from point 3 to point 3'. The fluid introduction and withdrawal is then interrupted and the passive period of the step is commenced. The passive period continues until the saccharide profile has advanced to point 4. At this time the saccharide profile has advanced one full step downstream. The points of fluid introduction and withdrawal are then advanced downstream one bed and fluid introduction and withdrawal is recommenced.

EXAMPLE 1

An eight train simulated moving bed unit designed for the separation of fructose from dextrose was converted into two four bed trains in order to provide a paired separation unit as described herein. Appropriate piping was added to the unit to permit alternate feed and withdrawal to each of the two trains. The mass balance on each four bed train is set forth in Table 1. The flow rates of the streams entering the four beds are numbered 1 to 4.

Operating the system in accordance with the conditions set forth in Table 1 results in a 97% recovery of dextrose in the raffinate stream and 87% recovery of fructose in the extract stream. The higher sugars, which include maltose, triose and higher saccharides, are also concentrated in the raffinate stream as compared to the extract stream. The extract stream is readily concentrated in suitable evaporators to provide a high fructose syrup having a dry solids (ds) of 77 percent, and a fructose content of 90–94% by weight dry solids basis.

The recovery of fructose and dextrose in the paired four train separation unit compares favorably with recovery in a conventional eight train separation unit. However, the pressure drop across each of the four beds is substantially lesser than is the pressure drop across each of the beds in the eight bed train. Under the conditions of Table 1 the pressure drop across a column is 30 psi. This compares with a pressure drop of 60–100 psi that occurs when the two four bed trains are connected in series and operated as an eight bed train. The throughput may be increased by as much as 50% without increasing the pressure drop above about 40 psi while maintaining substantially the same product quality and yields.

TABLE I

| Stream Description | Flow, gpm | D.S. % | Sp. G. | D.S. #/Gal | Fructose #DS/min | Dextrose #DS/min | Highers #DS/min | Water #/min |
| --- | --- | --- | --- | --- | --- | --- | --- | --- |
| Feed | 1.0 | 60 | 1.278 | 6.38 | 2.83 | 3.32 | 0.22 | 4.28 |
| Elut. Water | 1.7 | 0 | 1.000 | 0 | 0 | 0 | 0 | 14.14 |
| Raffinate | 1.7 | 24 | 1.094 | 2.23 | .36 | 3.22 | 0.15 | 11.73 |
| Extract | 1.0 | 28 | 1.112 | 2.63 | 2.47 | .09 | 0.07 | 6.66 |
| 1 | 4.0 | 43 | 1.184 | 4.25 | 6.59 | 9.33 | 1.08 | 22.40 |
| 2 | 2.3 | 24 | 1.094 | 2.23 | 0.50 | 4.42 | 0.21 | 15.80 |
| 3 | 4.0 | 3 | 1.004 | 0.28 | 0.37 | 0.27 | 0.51 | 32.29 |
| 4 | 3.0 | 28 | 1.112 | 2.63 | 7.40 | 0.28 | 0.21 | 19.87 |

1. gpm = gallons per minute.
2. D.S. = dry solids.
3. Sp.G. = Specific gravity.

What is claimed is:

1. In a method for the separation of an extract component from a raffinate component contained in a fluid feed stream in a simulated moving bed chromatographic separation train having a plurality of serially connected sorbent containing beds and means for recycling fluid through said train, wherein single extract and raffinate concentration profiles are established across the entire train which advance downstream in said train in the direction of recycle flow in response to the rate of recycle flow, wherein there are means for introducing or withdrawing fluid streams at spaced points along the train, wherein the feed stream is introduced into the train at a feed point, a raffinate rich stream is withdrawn at a second point downstream of said feed point, a desorbent stream is introduced at a third point downstream of said second point and an extract rich stream is withdrawn at a fourth point downstream of said third point, and wherein the points of introduction and withdrawal of said streams are periodically shifted downstream of said train in the direction of recycle flow in a series of timed steps in response to the downstream advancement of said concentration profiles within said train, the improvement which comprises:
- continuously recycling fluid through all of the sorbent beds in the train,
- dividing each of the timed steps into an active period and a rest period,
- introducing the feed and desorbent streams and withdrawing the raffinate and extract streams throughout the active period of each step, and
- ceasing the introduction and withdrawal of said streams throughout the rest period of each step.

2. A method in accordance with claim 1 wherein the feed stream is introduced adjacent the point of maximum total concentration of extract and raffinate components.

3. A method in accordance with claim 1 wherein the desorbent stream is introduced adjacent the point of minimum total concentration of extract and raffinate components.

4. A method in accordance with claim 1 wherein during the rest period of each step, the feed stream and the desorbent stream are introduced into and a raffinate rich stream and an extract rich stream are withdrawn from a second separation train.

5. A method in accordance with claim 1 wherein the feed stream is an aqueous mixture of fructose and dextrose and the desorbent stream is water.

6. A method for the simulated moving bed chromatographic separation of an extract component from a raffinate component contained in a fluid feed stream in a plurality of separate chromatographic separation trains, each of said trains including a plurality of serially connected sorbent containing beds, means for recycling fluid through all of the sorbent beds in said train, and means for introducing and withdrawing fluid streams at spaced points along the train, comprising:
- continuously recycling fluid in each of said trains to establish independent extract and raffinate concentration profiles across each of said trains which advance downstream in said trains in the direction of recycle flow in response to the rate of recycle flow in each of said trains,
- introducing the feed stream into a first of said trains at a feed point determined by said concentration profiles in said first train, withdrawing a raffinate rich stream from said first train at a second point downstream of said feed point, introducing a desorbent stream into said first train at a third point downstream of said second point and withdrawing and extract rich stream from said first train at a fourth point downstream of said third point,
- shifting the introduction of said feed and desorbent streams and the withdrawal of said raffinate rich and extract rich streams from said first train to a second of said trains while continuing the recycling of fluid in each of said trains,
- said feed stream being introduced at a feed point determined by the concentration profiles in said second train, said raffinate rich stream being withdrawn at a second point downstream of said feed point, said desorbent stream being introduced at a third point downstream of said second point and said extract rich stream being withdrawn at a fourth point downstream of said third point,
- shifting the introduction of said feed and desorbent streams and the withdrawal of said raffinate rich and extract rich streams to the next of said trains, the points of introduction and withdrawal of said streams being determined by the concentration profiles in said next train.

7. A method in accordance with claim 6 wherein the plurality of separate chromatographic separation trains comprises two trains.

8. A method in accordance with claim 6 wherein the feed stream is an aqueous mixture of fructose and dextrose and the desorbent stream is water.

* * * * *